Jan. 8, 1957          C. E. LOWE          2,777,114

RESISTANCE SENSITIVE PHASE-SHIFTER

Filed Aug. 11, 1951          2 Sheets-Sheet 1

INVENTOR.
CHARLES E. LOWE
BY

Jan. 8, 1957   C. E. LOWE   2,777,114
RESISTANCE SENSITIVE PHASE-SHIFTER
Filed Aug. 11, 1951   2 Sheets-Sheet 2
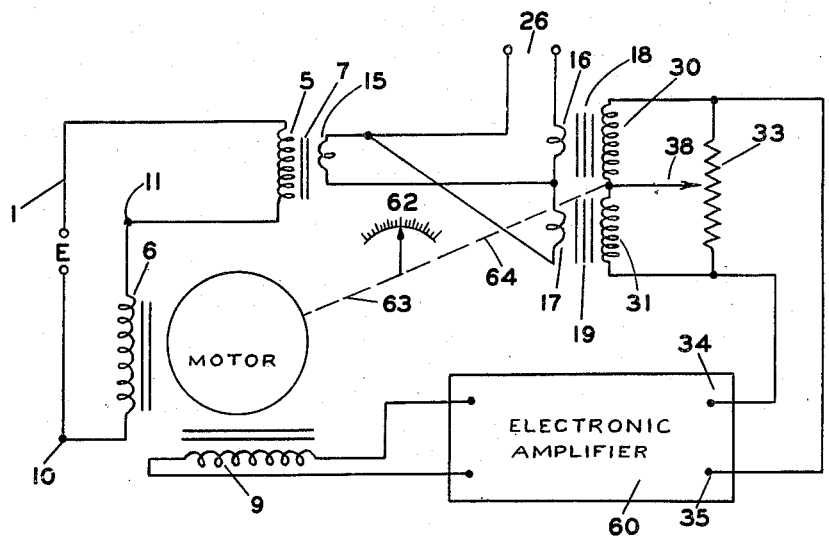
fig. 3
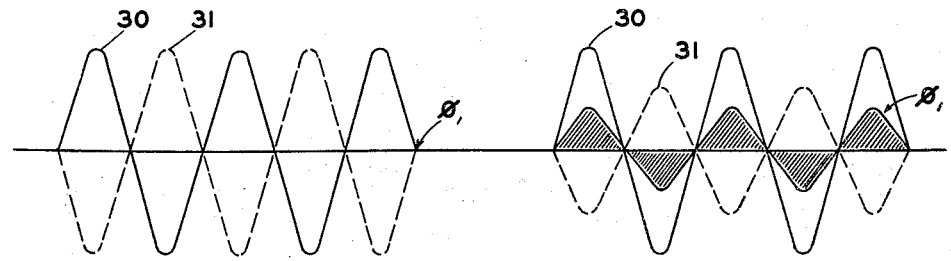
fig. 4
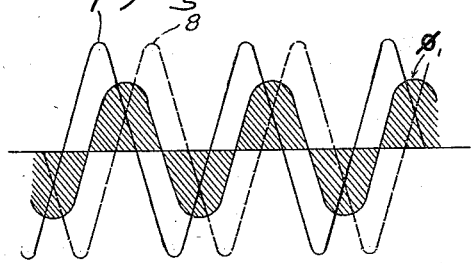
fig. 5
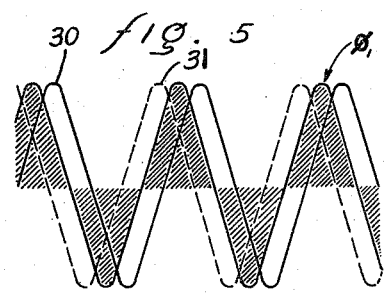
fig. 6
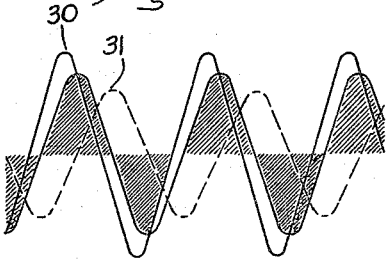
fig. 7
fig. 8
INVENTOR.
CHARLES E. LOWE
BY

United States Patent Office 2,777,114
Patented Jan. 8, 1957

2,777,114

RESISTANCE SENSITIVE PHASE-SHIFTER

Charles E. Lowe, Fenton, Mich.

Application August 11, 1951, Serial No. 241,397

10 Claims. (Cl. 324—57)

This invention relates to means for measuring small values of resistance and/or reactance, and relates particularly to a device by which the introduction of said resistance and/or reactance into one of a pair of alternating current circuits effects a measurable shift in phase at a pair of terminals energized by said one circuit. Further, the invention relates to a phase discriminating control device which can be utilized for effecting a variety of control functions in response to variations in said resistance and/or reactance.

In conventional practice, the usual way to measure small values of resistance is with a laboratory type of device, such as a double Kelvin bridge, which requires large currents to be sent through the resistance to be measured.

The use of large currents limits such measurement to equipment utilizing conductors that are capable of carrying such currents safely and they also make it necessary to use a bulky power supply. Because of the large heating effect associated with large currents, the power supply is necessarily used only intermittently. Also, the signal obtained to operate the meter and indicate the resistance is not readily amplified or adaptable to electronic control methods.

It is thus desirable to have a means that will not only continuously measure values of resistance, and accurately and instantly vary the indication of said measurements in response to variations in said resistance, but it is also desirable to provide a means by which said variations will effect the control of other apparatus.

Accordingly, a principal object of the invention is the provision of a device for measuring very low resistances and/or reactances whereby a desired effect on other apparatus may be readily produced in response to very small changes in the magnitude of said resistance or reactance.

Another object of the invention is to provide apparatus of the type aforesaid capable of indicating minute values of resistance without requiring large currents to be passed through the element being measured.

Another object of the invention is to provide a method for controlling other apparatus in response to very small changes in resistance and/or reactance.

A further object of this invention is to provide a highly sensitive means of measuring or detecting small resistive and/or reactive values that are highly immune to electrical or physical shock, voltage or frequency variations, and ambient conditions of operation.

A further object of the invention is to provide apparatus of the type aforesaid which is capable of embodiment in an instrument which will be conveniently portable and sufficiently rugged for general testing applications.

A further object of the invention is to provide apparatus of the general type aforesaid which is sufficiently simple and is capable of being constructed readily and economically.

Other objects and purposes of the invention will be apparent to persons acquainted with apparatus of this general type upon reading of the following disclosure and by reference to the accompanying drawings.

In the drawings:

Figure 3 is an elementary diagram of a circuit embodying my invention adapted for controlling an electric motor.

Figures 4, 5, 6, 7, and 8 show how small differences in the relationship of the two transformer output voltages when added together produce the resistance sensitive output signal of variable phase.

General description

In general, my invention contemplates a pair of circuits both energized from a single alternating source. One of said circuits includes phase shift means wherein the magnitude of the shift effected is responsive to a resistance. Thus, a very small resistance change in the phase shift circuit will effect a measurable change in the phase angle of said circuit whereas the other simultaneously energized circuit will not be affected. The difference in the phase angle between said two circuits may then be utilized to perform a variety of functions.

Detailed description

Figure 1:
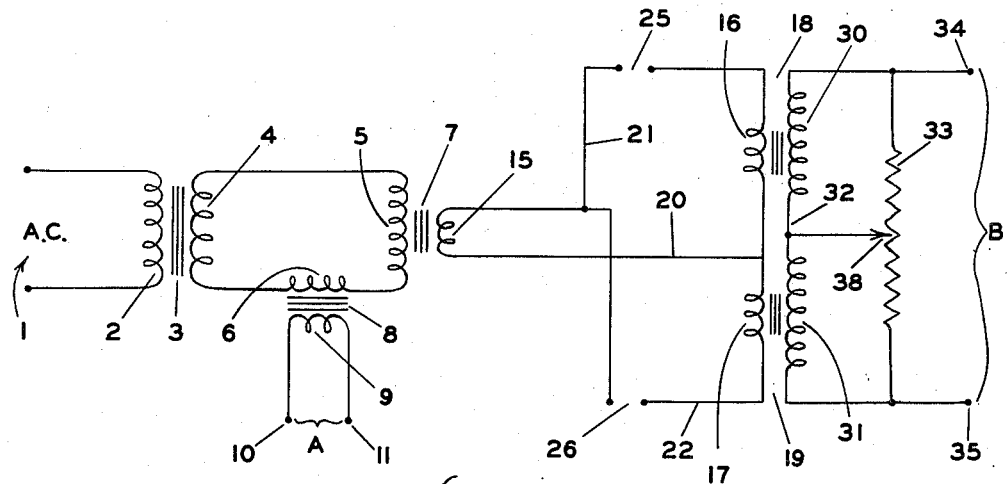
Figure 1 is an elementary diagram of a circuit embodying my invention.

Referring first to Figure 1, a source 1 of alternating current is applied to the primary winding 2 of the iron core transformer 3 and thereby energizes the secondary winding 4 of said transformer. Energization of said secondary winding 4 effects energization of the primary windings 5 and 6 of the iron core transformers 7 and 8, respectively. The secondary winding 9 of said transformer 8 energizes the terminals 10 and 11 and said terminals constitute the output terminals of the first phase circuit.

The second, or shiftable, phase circuit may be any of several kinds of known phase shift circuits and here commences with the secondary winding 15 of the transformer 7 by which is energized primary windings 16 and 17 of the iron core transformers 18 and 19, respectively. A conductor 20 connects one side of the secondary winding 15 to the adjacent, mutually connected ends of said primary windings 16 and 17. Other conductors, including conductors 21 and 22, connect the other side of said secondary winding 15 to the respective other ends of said primary windings 16 and 17. A gap 25 is provided for reasons appearing hereinafter in the conductor 21, and a gap 26 is similarly provided in the conductor 22.

The secondary windings 30 and 31 are connected at their respective first ends to each other by a conductor 32 and connected at their respective other ends to respectively opposite ends of a resistance 33. A variable tap 38 associated with said resistance 33 is connected to a point on the conductor 32 intermediate said secondary windings 30 and 31.

The terminals 34 and 35 constitute the output terminals of said second phase circuit. The terminal 34 is connected to a point intermediate the secondary winding 30 and the end of the resistance 33 connected thereto and the terminal 35 is connected to a point intermediate the secondary winding 31 and the end of the resistance 33 connected to it.

In order to obtain as low resistive and inductive reactance as possible within said circuit, and thereby improve its accuracy, the primary winding 5 of the transformer 7 comprises many turns of wire and the secondary winding 15 is wound of only a few turns of wire.

Yet it must have sufficient turns that its output voltage will be sufficient to pass current through whatever contact barriers as films, coatings, or ionized layers, that may exist in either of the gaps 25 or 26 wherein there are to be placed the elements whose resistance is to be measured.

The transformers 18 and 19 are identical with each other in order to secure circuit stability. The primary windings 16 and 17 of each thereof are wound of a few turns of heavy wire and all of the leads and connections are kept at as low a resistance as possible.

*Operation*

The operation of the basic circuit above described is probably apparent from the above description but will be reviewed in detail for the purpose of completeness in this disclosure.

In general, the source of alternating current 1 is caused to energize two circuits through the transformers 7 and 8. The phase of the alternating potential imposed onto the terminals 10 and 11 constitute a reference point against which the potentials appearing at the terminals 34 and 35 are measured.

Energization of the secondary winding 15 effects energization of the primary windings 16 and 17 in a conventional manner. Energization of these last named windings effects energization of the secondary windings 30 and 31 and thereby imposes alternating potentials at the terminals 34 and 35, the phase of which may be shifted in a well known manner by movement of the variable tap 38 along the length of the resistance 33 for any given condition of resistance in the gaps 25 and 26.

Therefore, it will be apparent that by shorting either of the gaps 25 and 26, or by placing a known resistance across one of said gaps, and with some value of resistance in the other of said gaps, the circuit may be balanced by said adjustment of the variable tap 38 so that the alternating potential appearing at B on the terminals 34 and 35 will be in a predetermined phase relationship with the potential appearing at A on the terminals 10 and 11. Then, the making of very slight variations in the resistance at either of the gaps 25 and 26, while maintaining the resistance constant in the other of said gaps, and without shifting the variable tap 38, will result in a measurable shift of phase in the potential appearing at the terminals 34 and 35 as compared with the potential appearing at terminals 10 and 11. This shift may be utilized in a variety of ways.

Reference has been made above to the use of resistance in both of the gaps 25 and 26. Such is the general situation and may be utilized where it is desired to measure a resistance which is subject to ambient conditions which are not desired to be measured. Under such circumstances, if the resistance to be measured is placed in the gap 26, another resistance subject to similar ambient conditions is placed in the gap 25. Thus, the ambient conditions will cancel each other out and only the uncancelled variations in the resistance closing the gap 26 will affect the output potentials appearing at the terminals 34 and 35.

The use of large turn ratios in the transformers 18 and 19 not only provides output signals of directly usable magnitude, but it also provides ready means of balancing phase and amplitude of the currents and their secondary voltages at an impedance level readily reached by standard parts. In this, it eliminates the need for precise or difficult parts located in the low impedance path of the two currents that could be troublesome as a constant source of probable error and erratic operation. Thus, the balancing of the circuit in the potentiometer comprising the resistance 33 is effective and readily compensates for other variations in the equipment.

Despite the use of low resistive and reactive quantities in the measuring circuit, a small change in resistance in gap 26 produces only a very small phase shift of the current through transformer winding 17. However, when the stepped up voltage effects of this current across 31 are compared with the stepped up voltage effects of the current in 16 across 30, and appearing in phase opposition at the terminals 34 and 35, this shift becomes very noticeable in the difference signal across 34 and 35. In practice, this difference signal is rarely zero because the resistance in the current path through each of the primary windings 16 and 17 is rarely equal and the output voltages across the respective secondary windings 30 and 31 are then rarely equal.

Unequal amplitude between the two signals across windings 30 and 31 provides phase shift of the output signal across terminals 34 and 35 by displacing its peaks from the position of being equally spaced between the peaks of the transformer signals, as exists for signals of equal amplitude, into a position whereby the peaks of the output signals at terminals 34 and 35 are displaced towards the peak of the signal of greater magnitude, with respect to secondary windings 30 or 31. The amount of such displacement is in proportion to the degree of inequality existing between the two signals. Thus, although a small change of resistance in the measuring circuit, as at the gap 26, does not by itself greatly change the phase of the currents, it does vary the output voltage in the secondary winding 31 which adds to the phase shift of the output signal. This in effect multiples the actual phase shift.

In introducing an inductive reactance into the gap at 26, a somewhat different result is obtained. Whereas, as above described, a resistance in the gap 26 both decreases the phase lay of the signal from the secondary winding 31 as well as its amplitude, the introduction of an inductive reactance into said gap increases the phase lag of said signal and decreases its amplitude. These two effects oppose each other in shifting the phase of the output signal at the terminals 34 and 35 and, although the influence of one might exceed that of the other, since they are at least partially opposite in effect, the response is not as great for an inductive reactance as it is for resistance of the same value. However, there is enough response to reactive effects such that the circuit will respond to a saturable reactor in the gap 26 which can be varied by a small D. C. current and so produce a signal having a phase of small current value which has other useful applications.

Figures 4 to 8 inclusive show how small differences in the relationship in the output of the secondary windings 30 and 31 will add together in manner to increase the effect just described.

In Figure 4 is shown how the two output voltages from 30 to 31 cancel out when they are exactly equal and opposite in phase as mentioned above.

Figure 5 shows the difference when the phase of one is slightly changed while the phase of the other remains constant. When the amplitudes of the two signals are equal, as in this example, the resultant difference signal ($\phi_1$) is of the same frequency but has its peaks halfway between the peaks of the two original signals.

Figure 6 shows what happens when the phase of one is shifted slightly in the opposite direction from that shown in Figure 5. The difference signal is again halfway between peaks, but in a completely opposite phase to that shown in Figure 5. The phase of this output signal ($\phi_1$) is then highly sensitive to the direction in which the phase of the two transformer signals shift. It can be said that the original shift has in effect been multiplied.

But these conditions have been for signals of equal amplitude being subtracted from each other. Equal amplitude would be rare in practice, and it is important to see how a gradual and continuous shift in phase for ($\phi_1$) results when two signals differ in amplitude as well as phase opposition.

Unequal amplitude between the two signals provides phase shift of the output signal by displacing its peaks from the position of being equally spaced between the peaks of the transformer signals that was shown for signals of equal amplitude. The peaks of the output signal are displaced towards the peaks of the signal of greater magnitude in proportion to the degree of inequality existing between the two signals.

In Figure 4 it was shown that for exactly equal amplitude and opposite phase conditions the two signals cancel out and ($\phi_1$) becomes zero. In Figure 7 is shown how a difference in amplitude results in an output signal of the same phase as the larger one.

In Figure 8 is shown the result of a phase shift like that of Figure 5, but now the signals have unequal amplitudes. Consequently, in this case the peaks of the different signal ($\phi_1$) are closer to the peaks of the larger signal and are not halfway between the two peaks of the signals as in Figure 5.

It is important to note that the direction of phase difference from being exactly out of phase between the two transformer output signals determines the direction that the output signal is shifted. But the degree to which it is shifted depends upon the relative amplitudes of the signals.

Modifications

Figure 2:
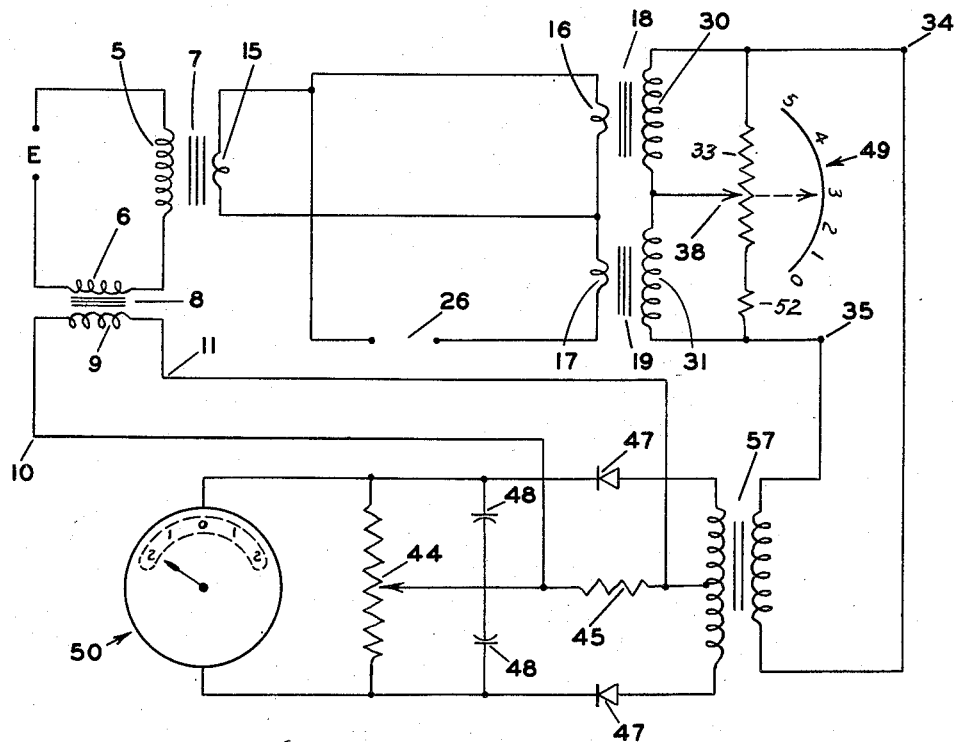
Figure 2 is an elementary diagram of a circuit embodying my invention and associated with a suitable meter responsive to a resistance being investigated.

In Figure 2 appears a phase discriminator circuit connected to the terminals 10 and 11 at one portion thereof and to the terminals 34 and 35 at another portion thereof. Such a discriminator circuit is well known and needs no detailed description. The potentiometer 44 allows the discriminator circuit to balance when the difference in phase angle between the respective pairs of output terminals is 90° and thereby effects a zero reading on the meter 50. Such balancing means is necessary to compensate for any possible difference in the rectifiers 47, the capacitors 48 or the two halves of the secondary winding of the transformer 57. The resistance 52 is introduced into the circuit to allow the tap 38 of the potentiometer 33 to balance the meter for zero at the end of its scale 49 when the resistance across the gap 26 is of the lowest possible value. In this manner the scale of the tap 38 can be calibrated in terms of resistance across the gap 26. It will be noted that in this circuit the gap 25 is not shown inasmuch as it will not normally be used.

Figure 3 shows how a two-phase motor can be operated in response to small changes of resistance at the gap 26. One phase of the motor is energized by directly connecting it in series with the output terminals 10 and 11. It will be obvious in the light of the foregoing that the value of the source 1 and of the various resistance and impedance components should be such that the potential supplied at terminals 10 and 11 should be adequate for effective motor operation.

The other phase of said motor is supplied from a suitable electronic amplifier 60, of any conventional form, which in turn is activated by potentials at the terminals 34 and 35.

As indicated in the drawing, the motor is shown as self-balancing and connected by any conventional means 63 to an indicator 62 for indicating the magnitude of the resistance closing the gap 26. Obviously, however, in view of the foregoing, in place of the indicator 62, the motor could as well be operating a valve, a switch, or other desired apparatus.

By directly connecting the motor to the mounting of the tap 38, as indicated by the broken line 64, the motor may be caused to move the said tap 38 and thus automatically adjust same to eliminate differences between the phase of the output at terminals 10 and 11 and the output at terminals 34 and 35 that cause motor operation.

The herein disclosed system, by making possible amplification without loss of accuracy permits the use of smaller currents in the measured resistance for the very low ranges which it is its purpose to measure. And thus it not only indicates said resistance accurately but it permits accurate control by the influence of very small resistance changes not otherwise possible by presently known circuits and/or techniques. Use of smaller currents also permits continuous use, permits measurement of those conductors which could not pass large currents, and by not raising the temperature of the resistance gives a more accurate reading. Further, by the use of A. C. currents to measure resistance under circumstances which minimize the effect of inductive reactance, the apparatus results in an A. C. measurement of very small resistance and does so under circumstances which enable it to approach very close to the true D. C. ohmic value.

Since the phase shift is obtained by means using very small reactances and is not dependent upon resonance conditions, it is highly independent of power supply frequency variations. The circuit can be considered as unaffected by normal allowable frequency variations and can even accept variations in excess of normal without becoming unusable.

Whereas in the several examples, the potential appearing at the terminals 10 and 11 has throughout been assumed to be of the same phase as the potential of the supply, it will be recognized that this phase relationship need not be identical, providing only that it does not change in response to changes in the resistance at the gap 26. In other words, if the circumstances under which this invention is to used, require that the apparatus supplying the output terminals 10 and 11 be of such nature that a phase shift will take place between the source 1 and said output terminals 10 and 11, this is not prohibitive of the use of my invention, for the actuating characteristics thereof consist of changes in the difference in phase between the terminals 10 and 11 and the terminals 34 and 35, rather than in any particular phase condition of either of said pair of terminals by itself.

Among the further applications for this circuit is the control resistance welding wherein the resistance across the welding electrodes, and that of the material being welded, can be utilized to control the welding current and/or the electrode pressure during the welding process by automatic means and thus provide a highly desirable and accurately controlled weld.

It will be appreciated that while I have selected certain specific embodiments as illustrative of my invention, the same may also be embodied in a variety of other circuits which will come within the terms of the hereinafter appended claims excepting as said claims may by their own terms expressly require otherwise.

I claim:

1. In apparatus for measurement of the resistive value of a conductor, the combination comprising: means connectable to a source of constant frequency alternating current; a first pair of output terminals and means connecting said terminals to said source, said means being of such character that the phase at said first pair of output terminals will bear a predetermined and unchanging relationship to the phase of said alternating current supply; a transformer and means for energizing the primary winding thereof from said source; second and third transformers and means connecting the one end of the primary windings thereof to each other and other means connecting a first side of said secondary winding of said first transformer to a point intermediate the primary windings of said second and third transformers; means including means providing a gap connecting the second side of the secondary winding of said first transformer to the other end of the primary winding of one of said second and third transformers and means connecting the second side of secondary winding of said first transformer to the other end of the other of said primary windings of said second and third transformers; means connecting the one ends of the secondary windings of said second and third transformers to each other and means connecting the respective other ends of said secondary windings of said second and third transformers to the respective output terminals; a variable resistor having a slider; means connecting said variable resistor between said output terminals and means connecting the slider thereof to a point intermediate the inter-connected ends of the secondary windings of said second and third transformers.

2. The device defined in claim 1 including an electrosensitive device adapted for providing mechanical motion in one of two directions according to the respective phase of A. C. impulses supplied thereto; means connecting the first pair of output terminals to one side of said device and means connecting the second pair of output terminals to the other side of said device; and means connecting the mechanical output of said device to said variable resistor for maintaining the phase of said second pair of output terminals in synchronism with the phase of said first pair of output terminals.

3. In apparatus for measurement of the resistive value of a conductor, the combination comprising: means connectable to a source of constant frequency alternating current; a first pair of output terminals and means connecting said terminals to said source, said means being of such character that the phase at said first pair of output terminals will bear a predetermined and unchanging relationship to the phase of said alternating current supply; a transformer and means for energizing the primary winding thereof from said source; second and third transformers and means connecting the one ends of the primary windings thereof to each other and other means connecting a first side of said secondary winding of said first transformer to a point intermediate the primary windings of said second and third transformers; means including means providing a gap connecting the second side of the secondary winding of said first transformer to the other end of the primary winding of one of said second and third transformers and means connecting the other end of said secondary winding of first transformer to the other end of the other of said primary windings of said second and third transformers; means providing a phase shift circuit connecting the secondary windings of said second and third transformers to the respective output terminals.

4. The device defined in claim 3 wherein said gap comprises a pair of contacts insulated from each other.

5. The device defined in claim 3 including also means providing a gap within the same means connecting the other end of the secondary winding of said first transformer to the other end of the primary windings of the other of said second and third transformers, said gap itself comprising a pair of spaced electrical contacts.

6. In apparatus for measurement of the impedance value of a conductor, the combination comprising: means connectable to a source of constant frequency alternating current; a first pair of output terminals and means connecting said terminals to said source, said means being of such character that the phase at said first pair of output terminals will bear a predetermined and unchanging relationship to the phase of said alternating current supply; a transformer and means for energizing the primary winding thereof from said source; second and third transformers and means connecting the one ends of the primary windings thereof to each other and other means connecting a first side of said secondary winding of said first transformers to a point intermediate the primary windings of said second and third transformers; means including the impedance to be measured connecting the second side of the secondary winding of said first transformer to the other end of the primary winding of one of said second and third transformers and means connecting the other end of said secondary winding of first transformer to the other end of the other of said primary windings of said second and third transformers; means providing a phase shift circuit connecting the secondary windings of said second and third transformers to the respective output terminals.

7. Apparatus defined in claim 6 wherein said last-named means includes means connecting the one ends of said secondary windings of said second and third transformers to each other; a potentiometer interconnecting the other ends of said secondary windings of said second and third transformers, the slider thereof being connected to said one ends of said secondary windings; and said output terminals respectively connected to opposite ends of said potentiometer.

8. The device defined in claim 6 wherein said last-named phase shift circuit includes means connecting first ends of said secondary windings of said second and third transformers to each other; means connecting the respective second ends of said secondary windings of said second and third transformers to each other through a resistance and a conductor connecting a point intermediate the ends of said resistance to the first ends of said secondary windings of said second and third transformers; and means connecting said second ends of said secondary windings of said second and third transformers to respective output terminals.

9. The device defined in claim 6 including means automatically receiving signals from said first output terminals and simultaneously receiving signals from said second output terminals and providing an indication of the phase relationship between said sets of signals.

10. In apparatus for measuring the impedance value of a conductor, the combination comprising: means connectible to a source of constant frequency alternating current; a transformer and means connecting a pair of terminals from a first winding thereof; second and third transformers and means connecting the one ends of the first windings thereof to each other and other means connecting a first side of a secondary winding of said first transformer to a point intermediate the first winding of said second and third transformers; means including the impedance to be measured connecting the second side of the secondary winding of said first transformer to the other end of the primary winding of one of said second and third transformers and means connecting the other end of said secondary winding of said first transformer to the other end of the other of the first windings of said second and third transformers; means providing a phase shift circuit connecting the secondary winding of said second and third transformers to a second pair of terminals; means applying a source of constant frequency alternating current to one of said pairs of terminals; a pair of reference terminals and means connecting said reference terminals to said source, said last named means being of such character that the phase at said pair of reference terminals will bear a predetermined and unchanging relationship to the phase of said alternating current supply.

References Cited in the file of this patent
UNITED STATES PATENTS

| 1,684,403 | Mason | Sept. 18, 1928 |
| 1,841,088 | Christopher | Jan. 12, 1932 |
| 1,847,127 | Mayer | Mar. 1, 1932 |
| 2,446,527 | Chun et al. | Aug. 10, 1948 |
| 2,449,739 | Duttera | Sept. 21, 1948 |
| 2,471,105 | Gustafsson et al. | May 24, 1949 |
| 2,567,700 | Ehlschlager | Sept. 11, 1951 |
| 2,569,268 | Wild | Sept. 25, 1951 |